No. 813,651. PATENTED FEB. 27, 1906.
J. B. LADD.
SPEED VARYING MECHANISM.
APPLICATION FILED AUG. 8, 1904.
5 SHEETS—SHEET 1.
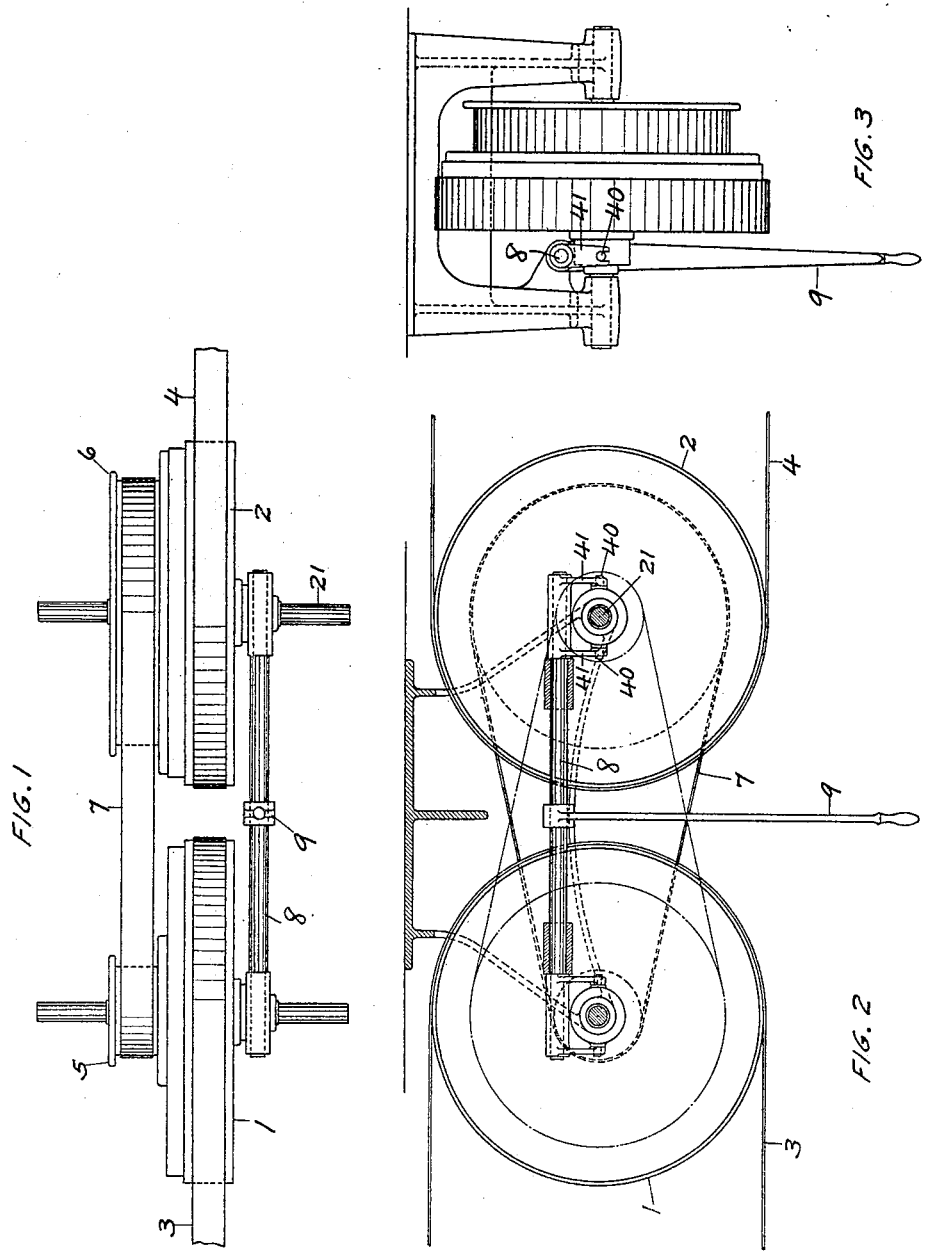
WITNESSES:
INVENTOR
James B. Ladd
BY
ATTORNEY.

No. 813,651. PATENTED FEB. 27, 1906.
J. B. LADD.
SPEED VARYING MECHANISM.
APPLICATION FILED AUG. 8, 1904.

5 SHEETS—SHEET 2.

WITNESSES:

INVENTOR
James B. Ladd
BY
ATTORNEY.

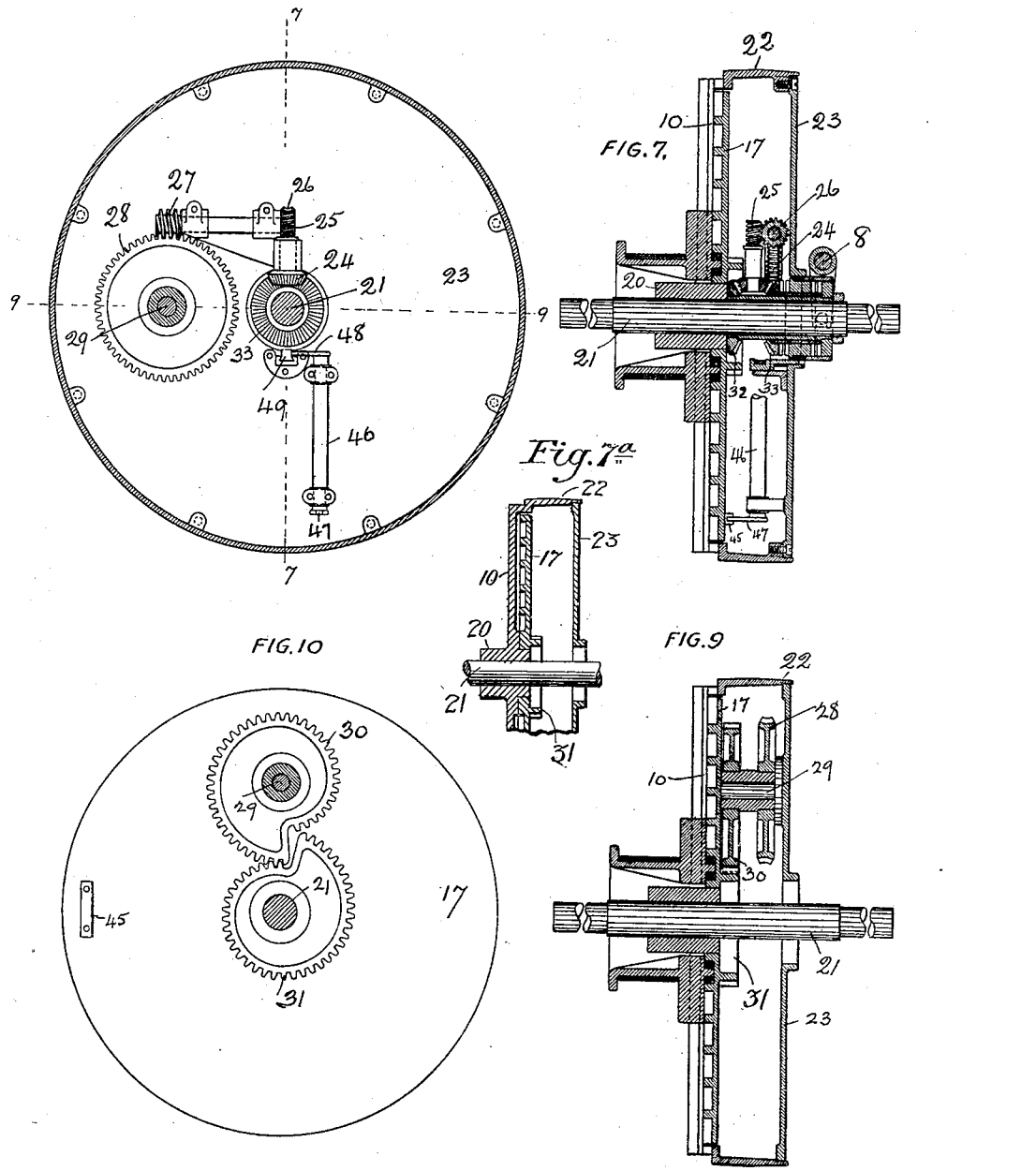

No. 813,651. PATENTED FEB. 27, 1906.
J. B. LADD.
SPEED VARYING MECHANISM.
APPLICATION FILED AUG. 8, 1904.

5 SHEETS—SHEET 4.

WITNESSES:

INVENTOR
James B. Ladd
BY
ATTORNEY.

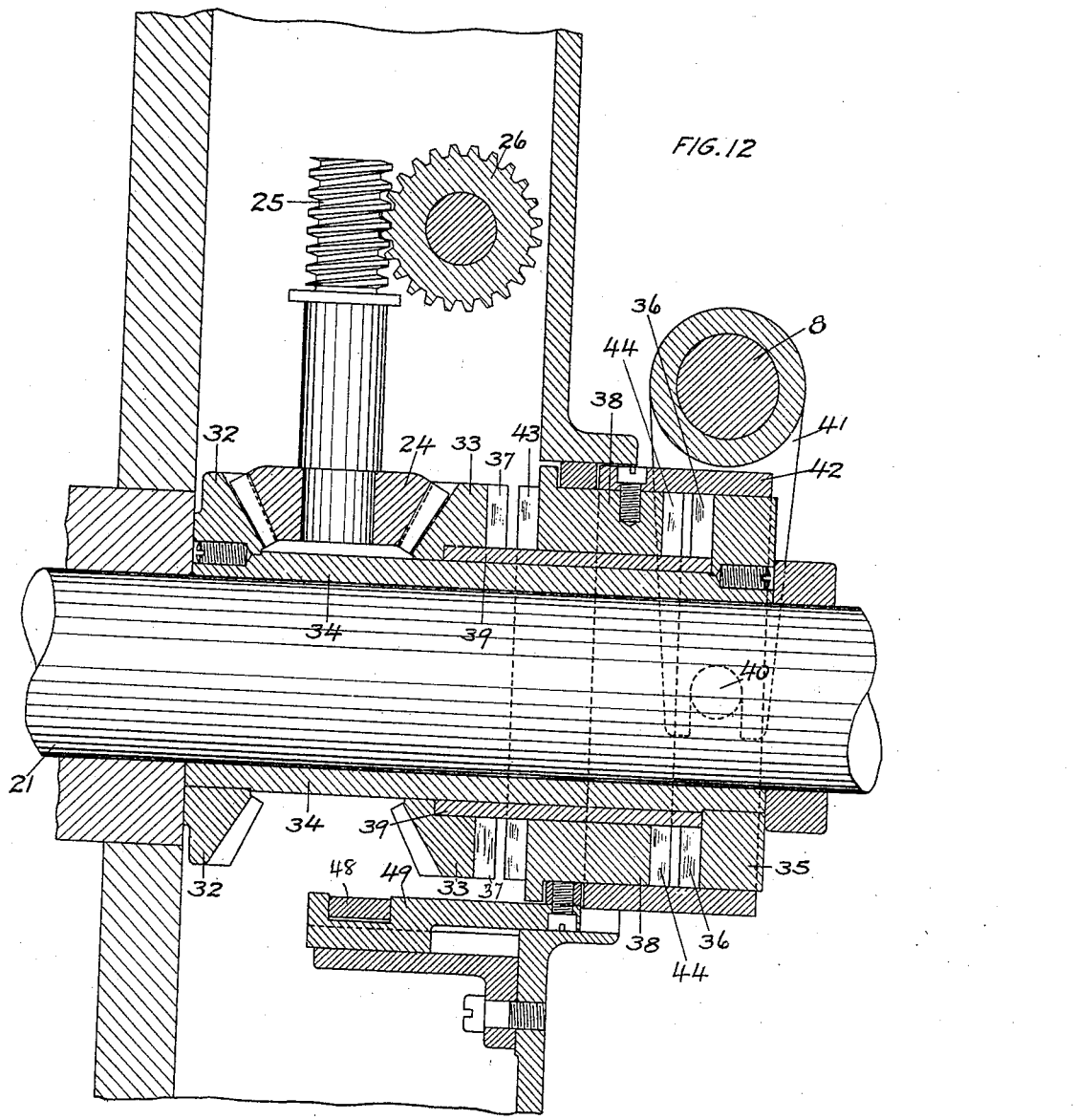

UNITED STATES PATENT OFFICE.

JAMES B. LADD, OF WAYNE, PENNSYLVANIA.

SPEED-VARYING MECHANISM.

No. 813,651.　　　　Specification of Letters Patent.　　　　Patented Feb. 27, 1906.

Application filed August 8, 1904. Serial No. 219,824.

*To all whom it may concern:*

Be it known that I, JAMES B. LADD, a citizen of the United States, residing at Wayne, Delaware county, and State of Pennsylvania, have invented a new and useful Speed-Varying Mechanism, of which the following is a specification.

My invention relates to improvements in speed-varying mechanism, my object being to provide mechanism whereby variations in speed are obtained from driving mechanism of constant speed.

My invention comprises, essentially, an expansible wheel.

My specific device herein illustrated and described provides means for varying the relative diameters of a pair of belt-connected pulleys without stopping the operation of the same.

My invention also comprises improved means for maintaining a continuous unbroken periphery or belt-carrying surface throughout the range of said variation in said pulley diameter.

My invention also comprises automatic means for limiting the operation of the varying means.

My invention also comprises means for maintaining the normal or required tension of the belt between said pair of pulleys unimpaired by the relative contraction and expansion thereof.

Among the advantages of my improvements are that my mechanism is adapted for use in connection with ordinary or standard belts, that said mechanism is compact, simple, and positive in operation, and as there is no lateral thrust in connection with the operation of my mechanism loss of power is saved in this respect and the necessity of complicated ball-bearing collars is obviated.

Figure 4:
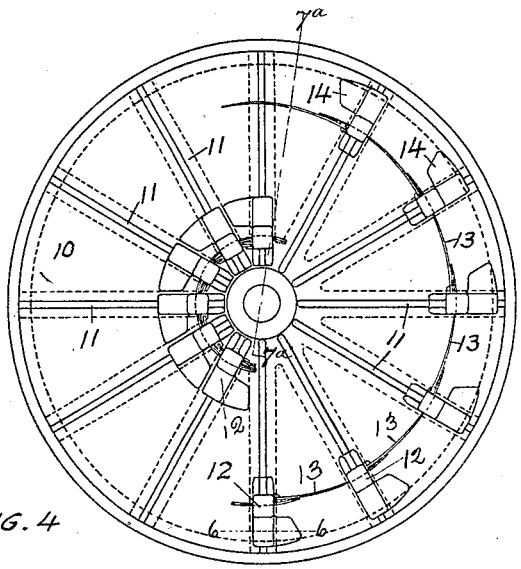
Figure 6:
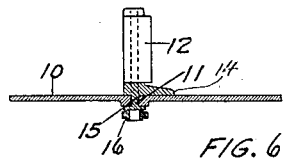
Figure 5:
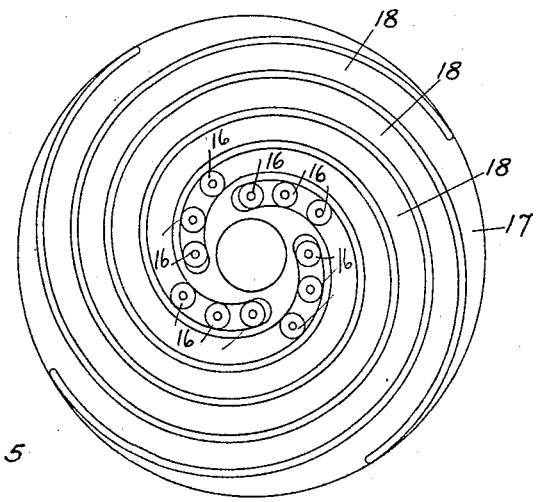
Figure 11:
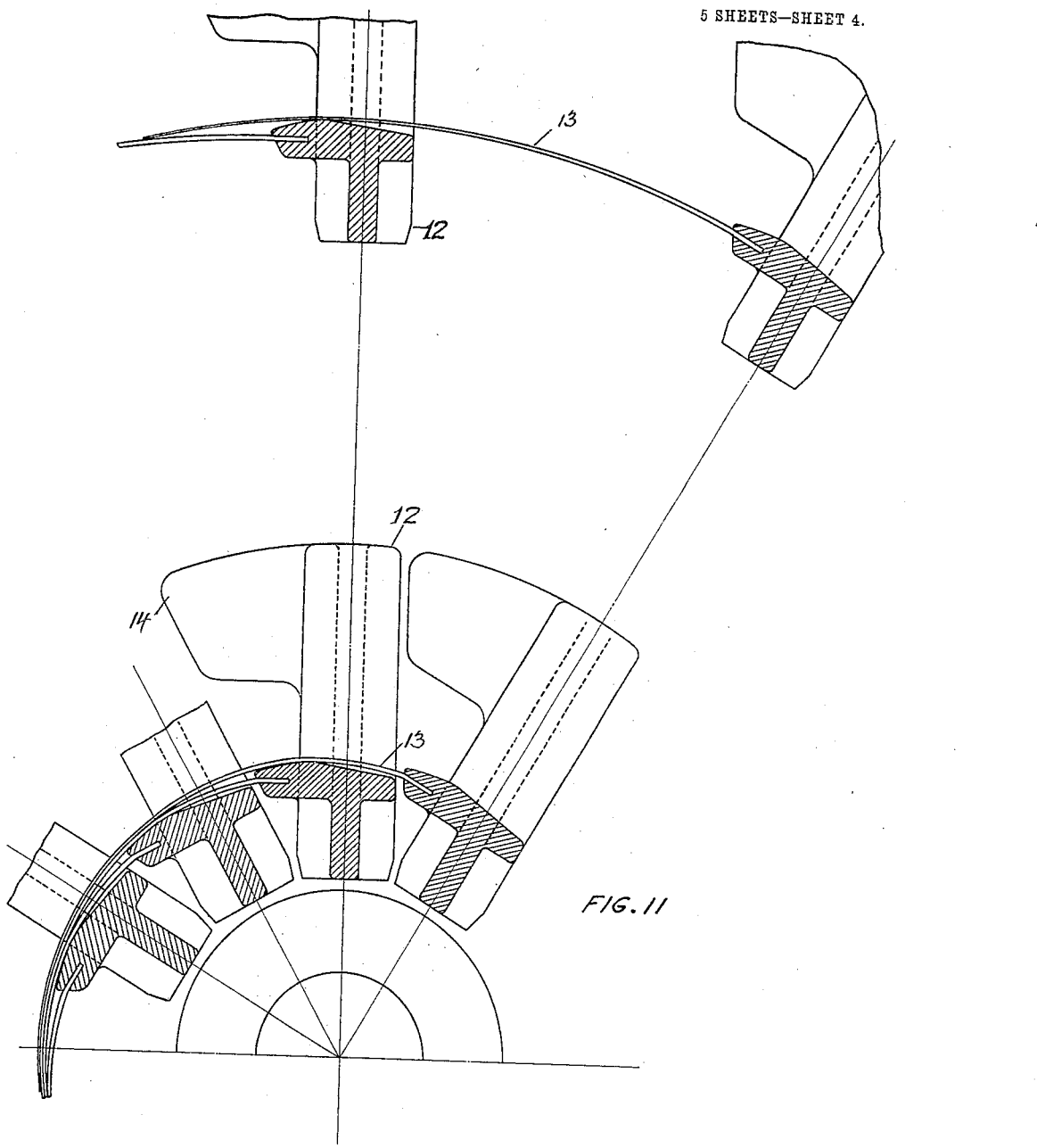

In the accompanying drawings, Figure 1 is a plan view of the mechanism containing my improvements. Fig. 2 is a side elevation of same. Fig. 3 is an end elevation of same. Fig. 4 is a view of the face of the pulley provided with radial slots or guide-channels, one-half of said pulley showing the position of the parts when the same is fully expanded, while the other half shows their position when the same is contracted. Fig. 5 shows the scroll-plate that fits upon the opposite side of the face of the pulley shown in Fig. 4. Fig. 6 is a partial view in cross-section on line 6 6 of Fig. 4. Fig. 7 is a section on line 7 7 of Fig. 8. Fig. 7$^a$ is a section on line 7$^a$ 7$^a$ of Fig. 4. Fig. 8 is an inside view of side plate 23 with the mechanism attached thereto. Fig. 9 is a section on line 9 9 of Fig. 8. Fig. 10 is an inside view of scroll-plate 4. Fig. 11 is a fragmentary view, enlarged, showing two adjustments of the pulley. Fig. 12 is a fragmentary view, enlarged, of the middle portions, as shown in Fig. 7.

Similar numerals refer to similar parts throughout the several views.

Referring to Figs. 1, 2, and 3, it will be seen that my device comprises the pulleys 1 and 2, 1 being driven by the belt 3 from the source of power, 2 being connected by belt 4 with the machine or other device to be operated and for which a variation in speed is desired. Pulleys 1 and 2 are operatively connected by the pulleys 5 and 6 and belt 7. By variation in the relative diameters of pulleys 5 and 6 it will be obvious that a variation in the speed of pulley 2 will result, the speed of pulley 1 being presumed to be constant. The means for accomplishing this relative variation in the diameters of pulleys 5 and 6 without stopping or interfering with the operation or rotation of the parts and without impairing the normal or proper tension of the belt 7 are among the objects of my invention. I accomplish this by mechanism arbitrarily operated by the shaft 8, controlled by hand-lever 9. This mechanism controls in a similar way each pulley 5 and 6 and may be described as follows: Referring to Fig. 4, the pulley is provided with the side plate 10, having a series of radial slots or guide-channels 11. In slots or guide-channels 11 are secured the members 12, which are adapted to slide radially in said slots or guide-channels. These members 12 are provided with the overlapping plates 13 and constitute face-forming sections which coöperate in forming a continuous unbroken periphery or face for the belt. These overlapping plates or members 13 are best shown in Figs. 4 and 11. They consist of long spring-plates each secured at one end in a recess in a member 12, respectively, the free end extending over an adjoining member 12 and the plate 13 secured thereto. When the pulley is in the most contracted position, each plate 13 will overlap a number of plates 13, as shown in the lower part of Fig. 11, and when the pulley is in the expanded position each plate 13 will overlap a portion of the adjoining plate 13 and its member 12, as shown in the upper part of Fig. 11. Thus it will be seen that the pulley has a capacity of expansion from a minimum diameter to three times said diameter without breaking the continuous peripheral surface of the pulley. It is also to be noted that the spring-plates 13 are given such a spring set as will cause them to contract tightly one upon the other even when the pulley is most contracted, so that the free end of each plate 13 is held tightly upon the underlying plate to maintain a smooth surface therebetween. The spring tension of these plates in the direction above described is also such as to resist any tendency to outward movement away from the axis of the pulley due to the centrifugal force exerted by the pulley's rotation. Beyond these plates 13 are secured the flanged extensions 14, integral with members 12 as supports or braces therefor. Upon the extensions 15 of members 12, which project through the slots or guide-channels 11 of plate 10, are mounted the wheels 16 for the purpose hereinafter to be described. Upon the opposite side of the plate 10 from that shown in Fig. 4 is mounted the scroll-plate 17, provided with three spiral channels 18, adapted to fit the wheels 16, the relative position of said wheels 16 with respect to the members 12, to which they are secured, being such as to maintain all of said members 12 in relative positions equidistant from the center or axis of the pulley when said wheels 16 are approximately in the initial position, as shown in Fig. 5. It will now be obvious that the independent rotation of plate member 17 with respect to plate 10 will cause a spiral movement of said pulleys in the spiral channels 18 and a radial movement of members 12 in the radial grooves 11 of plate 10. It consequently follows that a rotation of plate 17 with respect to plate 10 in one direction will cause the travel of members 12 and the overlapping plates 13 outwardly toward the circumference of plate 10, resulting in an expansion of the pulley formed by plate members 13, while a relative rotation between said plates 17 and 10 in an opposite direction will cause said members 12 to travel toward the axis of such rotation, which will result in a contraction of said pulley. This relative movement between plate members 10 and 17 is accomplished by the following mechanism: Plate 10 is rigid with bushing 20, which is keyed to shaft 21, and consequently rotates therewith, while the scroll-plate 17 is rotatably mounted on said bushing—that is, it has a rotation independent thereof. To plate 10 is secured the rim portion 22, Figs. 7, 7ª, and 9, forming the face of one of the pulleys 1 or 2, both pulleys being substantially alike, and to this rim or face member 22 is bolted the plate 23, so as to rotate with the shaft 21. Upon the inner side of this plate 23 are mounted the gear-wheel 24, the worm 25, worm-wheel 26, and worm 27, and coöperating gear 28 28 being mounted on the shaft 29, which also carries the spiral gear 30, (see Fig. 10,) which coöperates with spiral gear 31, secured to the rear side of scroll-plate 17. Upon the shaft 21, Figs. 7, 9, and 12, are loosely mounted the oppositely-disposed gears 32 and 33, meshing with the gear 24. Gear 32 is mounted on and keyed to bushing 34, to which is also keyed the outer ring 35 and the lug 36. Gear 33 is loosely mounted on the bushing 34 and is provided with the lug 37. A sleeve or collar 38 is slidably mounted on the bushing 39, which surrounds the bushing 34, and is supported against rotation by the trunnions 40 and levers 41 engaging the same. The ring 42 surrounds the ring 35 and is rigidly secured to sleeve 38. The sleeve 38 is provided with the lugs 43, adapted to coöperate with lugs 37, and lugs 44, adapted to coöperate with lugs 36. The levers 41 are secured to the shaft 8, which is controlled, as above stated, by hand-lever 9.

It will be noted that the lever 41 may be moved either forwardly or backwardly to shift the sleeve 38 to cause the engagement of lugs 43 with lugs 37 of gear 33 or to cause the engagement of lugs 44 with lugs 36 of gear 32. As above stated, gears 32 and 33 are mounted on shaft 21 and are therefore permitted either to be rotated by gear 24 or to be keyed against such rotation. When the sleeve 38 is moved to cause the engagement of lugs 37 and 43, the gear 33 is keyed against rotation, with a result that when the gear 24 is carried around with the shaft 21 it is caused to rotate in one direction by reason of its engagement with the fixed gear 33, and when the sleeve 38 is moved in the opposite direction to cause the engagement of lug 36 with lug 44 gear 32 is locked against rotation, and in the same manner the gear 24 is caused to rotate in the opposite direction. The gear 24 has operative connection through worm 25, wheel 26, worm 27, wheel 28, and spiral gear-wheels 30 and 31 with the plate 17. It results that the rotation of gear 24, as above described, in either direction causes a corresponding rotation of the scroll-plate 17, and, as above stated, the relative turning or rotating of plate 17 with respect to plate 10 will cause the movement of the members 12 toward or away from the periphery of the wheel to cause the contraction or expansion of the face or periphery of the pulley. It is also obvious that the parts being properly related the movement of the lever to cause the contraction of one pulley, as above described, will at the same time cause the engagement of the proper gear-wheel to result in the expansion of the other pulley, and vice versa.

It is a well-known fact in mechanics that a longer belt is required to pass around and connect a large and small pulley than is required for two pulleys of the same diameter the mean between the large and the small one, the pulleys of course being spaced the same distance between centers. It follows from this fact that if one pulley is made to contract in exactly the same ratio as the other is made to expand, and vice versa, the belt connecting the two would sometimes be loose and sometimes tight. To overcome this difficulty, I have provided the spiral construction of gears 30 and 31, which increases the ratio of movement of the scroll-plate to the movement of the shaft driving the pulley.

In view of the fact that there is obviously a limit of the expansive movement of the pulley parts, it is important to prevent the actuation of the gear 24 in the expanding direction beyond the limit of the expansive movement of said parts. For this purpose I have provided the following automatic throw-off. Upon the inner side of scroll-plate 17 I have secured the stop member 45, while on the plate member 23 I have mounted the rotatable shaft 46. (See Figs. 7, 8, and 10.) This shaft 46 is provided at one end with a lever 47, which is adapted to encounter and be actuated by the stop 45, while the other end of the shaft is provided with a lever 48, which is adapted to encounter and actuate the slide member 49, which engages with the sleeve 38 to cause the disengagement of lug 44 from lug 36 or lug 37 from lug 43, as the case may be. The relative positions of stop 45 and lever 47 are such as to permit the desired rotation of scroll member 17 with respect to the shaft 21 and the other parts rotated therewith as shall secure the desired expansion of the pulley. It is obvious that a corresponding automatic arrangement on each pulley will serve as an automatic control in either direction.

What I claim is—

1. In an expansible pulley, the combination of a pair of coöperating independently-rotatable elements, one having spiral and the other radial guides, a train of gearing adapted to operate between said two coöperating elements for causing their relative rotation, said gearing including means for automatically increasing the ratio between the rates of movement of said elements, and movable rim-sections having operative relationship each with a radial and a spiral guide.

2. In an expansible pulley, the combination of a pair of coöperating independently-rotatable elements, one having spiral and the other radial guides, a train of gearing adapted to operate between said two coöperating elements for causing their relative rotation, said gearing including a pair of spiral gear-wheels for increasing the ratio between the rates of movement of said elements, and movable rim-sections having operative relationship each with a radial and a spiral guide.

3. In an expansible pulley, the combination of a plurality of radially-movable face-forming sections, and means for causing the movement of the same, comprising two concentric independently-rotatable elements and a shaft for supporting the same, one element provided with spiral guides, the other with radial guides, train of gearing for actuating said elements relatively, said gear means including a pair of spiral gear-wheels for increasing the ratio between the rates of movement of said elements.

4. In an expansible pulley, the combination of a plurality of radially-movable face-forming sections, means for causing the movement of the same comprising two concentric independently-rotatable elements and a shaft for supporting the same, one element provided with spiral guides, the other with radial guides, a train of gearing for causing the relatively independent rotation of said two elements, said gearing including a pair of spiral gears for increasing the ratio between the rates of movement of said elements.

5. In an expansible wheel or pulley, the combination of a plurality of radially-movable face-forming sections and means for causing the movement of the same, comprising two concentric independently-rotatable elements, one provided with spiral guides and the other with radial guides, a shaft for supporting said rotatable elements, a train of gearing for causing the relatively independent rotation of said elements, and manually-operative means for arbitrarily reversing the direction of said rotation, said gearing including a pair of spiral gears for increasing the ratio between the rates of movement of the scroll element and the shaft driving the pulley.

6. In a speed-varying mechanism, a pair of expansible pulleys, each comprising a plurality of radially-movable face-forming sections, and means for causing the movement of the same, comprising two concentric independently-rotatable elements and a shaft for supporting the same, one element provided with spiral guides, the other with radial guides, a train of gearing for actuating said elements relatively, said gearing including a pair of spiral gear-wheels for increasing the ratio between the rates of movement of said elements.

7. In a speed-varying mechanism, a pair of expansible pulleys, each comprising a plurality of radially-movable face-forming sections, and means for causing the movement of the same, comprising two concentric independently-rotatable elements and a shaft for supporting the same, one element provided with spiral guides, the other with radial guides, a train of gearing for actuating said elements relatively, said gearing including a pair of spiral gear-wheels for increasing the ratio between the rates of movement of said elements, and throw-out mechanism for automatically rendering inoperative the gear-actuating means.

JAMES B. LADD.

Witnesses:
 MAE HOFMANN,
 LILLIAN M. HUDNUT.